(No Model.) 2 Sheets—Sheet 1.
A. B. LANDIS.
SCREW CUTTING HEAD.
No. 422,024. Patented Feb. 25, 1890.
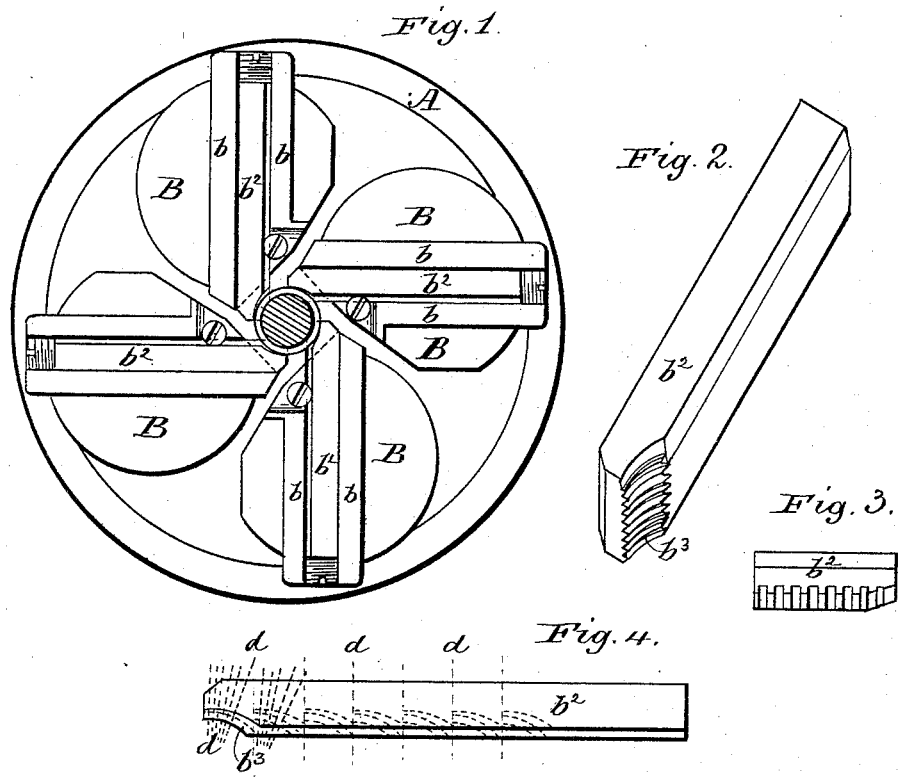
WITNESSES:
I. J. Masson
Chas. Schiller
INVENTOR
Abraham B. Landis
BY
E. E. Masson
ATTORNEY.

(No Model.) 2 Sheets—Sheet 2.

A. B. LANDIS.
SCREW CUTTING HEAD.

No. 422,024. Patented Feb. 25, 1890.

WITNESSES:
I. J. Masson
Chas. Schiller

INVENTOR
Abraham B Landis
BY
E. E. Masson
ATTORNEY.

UNITED STATES PATENT OFFICE.

ABRAHAM B. LANDIS, OF WAYNESBOROUGH, PENNSYLVANIA.

SCREW-CUTTING HEAD.

SPECIFICATION forming part of Letters Patent No. 422,024, dated February 25, 1890.

Application filed August 20, 1889. Serial No. 321,335. (No model.)

*To all whom it may concern:*

Be it known that I, ABRAHAM B. LANDIS, a citizen of the United States, residing at Waynesborough, in the county of Franklin, State of Pennsylvania, have invented certain new and useful Improvements in Screw-Cutting Heads, of which the following is a specification, reference being had therein to the accompanying drawings.

My invention relates to improvements in screw-cutting heads in which one or more cutters are mounted in rotatable holders, and is an improvement upon the device for which a patent was granted to me August 20, 1889, No. 409,208; and the objects of my improvements are to provide cutters therefor with segmental grooves or with straight grooves deeper or wider therein at the leading-in edge or bevel cutting of the cutter than on the balance of said cutter to facilitate the introduction of the bolt intended to be threaded; secondly, to permit the use of a cutter equal in length to one-half the diameter of the head, and to provide grooved devices for engagement with the thread of said cutter to retain it firmly but adjustably secured to the holder thereof. I attain these objects by the construction illustrated in the accompanying drawings, in which—

Figure 6:
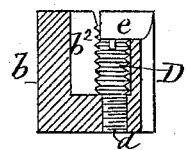
Figure 5:
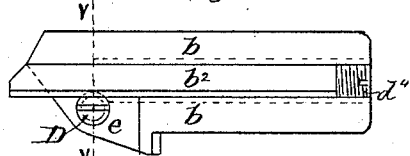
Figure 8:
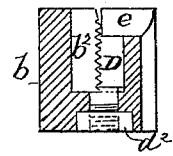
Figure 7:
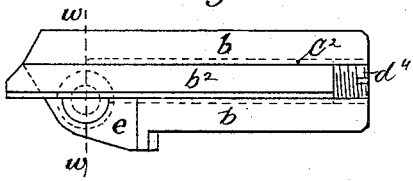
Figure 9:
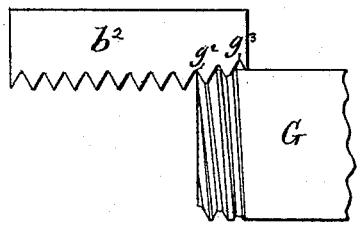
Figure 10:
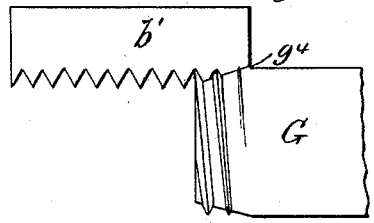
Figure 12:
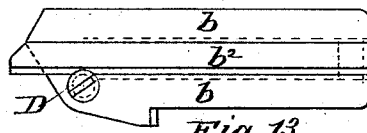
Figure 11:
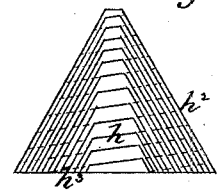
Figure 13:
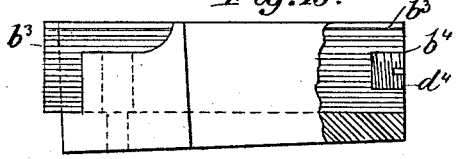

Figure 1 is a face view of a screw-cutting head constructed in accordance with my invention and internally constructed as shown in said Patent No. 409,208. Fig. 2 represents on a large scale and in perspective one of the improved cutters. Fig. 3 is an end view of a cutter adapted to cut square threads, but otherwise to be used to cut with its end, as intended with the cutter shown in Fig. 2. Fig. 4 is a side view of the cutter. Fig. 5 is a front view of one of the cutter-holding blocks and cutter, with a cutter-retaining screw having a series of annular grooves in its cylindrical body in engagement with the ribs or threads on the cutter. Fig. 6 is a transverse section of the same, on line $v\ v$ of Fig. 5. Fig. 7 is a front view of one of the cutter-holding blocks and cutter with a slightly-modified form of cutter-retaining device, the same consisting of a bolt and nut, the said bolt having nearly one-half of its body removed, and the flat surface thus produced is provided with grooves to receive the ribs or serrations upon the side of the cutter. Fig. 8 is a transverse section of the same on line $w\ w$ of Fig. 7. Fig. 9 represents an end view of one of the cutters longitudinally grooved upon its cutting-face, the depth of the grooves into the metal being deeper or wider at the blank-entering edge than along the balance of the cutter. Fig. 10 is a similar end view of an ordinary cutter having the bottom of its grooves all cut the same depth or in the same plane the entire width of its face. Fig. 11 is a diagram on a large scale illustrating the different amounts of metal removed by each tooth of both kinds of cutters in threading a bolt, the full lines indicating the improved cutter, while the dotted lines indicate the action of the ordinary cutter, (shown in Fig. 10,) the base of the cone indicating the proportions of metal removed by the first tooth of each device. Fig. 12 is a front view of one of the cutter-holders with the cutter therein extending to the rear end thereof. Fig. 13 is a side view of the same, partly broken away, to show the screw-receiving groove in the rear end of the cutter to permit the length of the latter to be equal to the half-diameter of the screw-cutting head.

In said drawings, A represents the casing of the cutter head or die, within which are placed the rotatable studs B, as shown in said Patent No. 409,208, and said studs have grooves $c$ in their front face to receive the cutter-holding blocks $b$, that are longitudinally slotted for the reception of the cutters $b^2$. Said cutters may be provided with a concave surface $b^3$ on the outer end and face thereof, cut with a die-hob in the usual manner. This concave surface is to facilitate the cutting of square threads, or nearly so, as shown in Fig. 3, as it gives clearance to the teeth. To sharpen this cutter, it is ground on the radial lines of the segment or concave surface $b^3$, as shown at $d$ in Fig. 4, so as to present cutting-edges on a plane passing substantially through the center of the blank intended to be cut. This is continued until the concave surface is worn too narrow. The cutter is then ground again at right angles to its sides and die-hobbed, and the operation is repeated. This form of cutter may be used for V-threads;

but it is not as economical to use it as the straight-grooved cutter. In hobbing these dies the blank-cutter can be set forward of radial line passing through the center of the hob by releasing the screw at its rear end. A slight circular clearance can thus be given to the cutter.

To cut V-grooved screws, one face of the cutter $b^2$ has straight grooves $b^3$ the whole length thereof. Said cutter is received in a groove extending the whole length of the holder $b$, and is forced to the bottom and retained in said groove by one of the clamping devices shown in the drawings, said clamping devices in this case having ribs and grooves upon their bodies to interlock with the grooves and ribs upon the face of the cutter. Said clamping device in Figs. 5 and 6 consists of a headless screw D, having a series of parallel annular ribs upon its body at the same distance apart as the grooves $b^3$ upon the face of the cutter. The outer end of the body of said screw has a transverse slot for the reception of the end of a screw-driver, by which it can be rotated and its inner end driven into the screw-tapped hole $d$ in the bottom of the cutter-holder after its ribs have been placed in proper engagement with the grooves $b^3$ of the cutter. A similar result is obtained by the construction shown in Figs. 7 and 8. The threaded end of the screw or bolt is therein shown in engagement with a nut $d^2$, placed in a recess in the bottom of the cutter-holder, and to bring it within the limits of said cutter-holder nearly one-half of the body of the bolt is removed, and the flat surface thus obtained is provided with parallel transverse grooves to engage with the grooves $b^3$ of the cutter.

To advance the cutter, the groove $C^2$ is screw-tapped nearly its whole length and has inserted therein a short headless screw $d^4$, that is thus adapted to press against the rear or outer end of the cutter.

To permit the cutter to be as long as the half-diameter of the screw-cutting head, the outer end of said cutter is recessed at $b^4$, as shown in Fig. 13, and the screw $d^4$ is placed in said recess, and two segmental portions of its periphery are in engagement with the screw-threaded portions of the sides of the cutter-guiding groove $C^2$ in the cutter-holder. By thus inclosing the screw $d^4$ it is protected from contact with the cuttings made by the tool, and the cutter thus protects also the screw-threads in the sides of the groove $C^2$ of the cutter-holder. The cutter-holders have the inner end of their face cut away at $e$ to give room for the free egress of the cuttings made by the cutters.

In Fig. 10 a blank-bolt G is represented in engagement with the first two teeth of a cutter $b'$ of the form generally used—that is, with the bottom of the grooves between the teeth on the same straight line and the grooves of the same width. At the blank-entering end the points of the teeth are cut at an angle $g^4$. The surface of the threads is very wide at that point and has very little leaving-in power, and the blank has to be pushed in, as the thread formed upon the blank projects but a little from its beveled surface. If said thread is depended upon to feed in the blank independently of other pressure upon the outer end of the blank, the thread is often torn off the blank; but by the construction shown in Fig. 9 this danger or defect is obviated. In this construction the bottom of the groove between the first few teeth $g^2$ $g^3$ are deeper into the body of the cutter than the balance of the grooves and the cutting-edge of the first three teeth is narrower than the corresponding teeth in Fig. 10, and thus the cutters have a much greater leading-in power as soon as the blank comes into contact with the cutters, as the threads upon the blank have more prominence, and the cutters will make a smooth thread on the end as well as on the balance of the blank, and the cutters will last longer, as the work of cutting the screw-thread upon the blank is more uniformly distributed. Said distribution of work or wear is illustrated by the diagram shown in Fig. 11, the full lines $h$ indicating the cutting made by each tooth of the cutter shown in Fig. 9, while the dotted lines $h^2$ indicate the cutting made by each tooth of the ordinary cutter, (shown in Fig. 10,) the base-lines $h^3$ indicating the work or wear upon the first tooth of the cutter.

Having now fully described my invention, I claim—

1. In a screw-cutting head or die, the combination of a longitudinally-slotted cutter-holding block and a cutter longitudinally secured adjustably therein, said cutter having its side concaved at the inner end and the cutting-face on the end and ground transversely on lines passing substantially through the center or axis of said cutter-head, substantially as described.

2. In a screw-cutting head, the combination of a longitudinally-grooved cutter-holding block and a cutter having longitudinal grooves upon its face, with a cutter-retaining screw in engagement with said block and having ribs in engagement with the grooves of said cutter, substantially as described.

3. In a screw-cutting head, the combination of a longitudinally-grooved cutter-holding block having the sides of said grooves screw-threaded, with a cutter having its outer end recessed and a screw in said recess and in engagement with the screw-threaded groove of the block, substantially as described.

4. In a screw-cutting head, the combination of a cutter-holder with a cutter having a series of thread-forming grooves, the bottom of which grooves is deeper into the metal of said cutter adjacent to the outer edge thereof than at the opposite or inner edge, and the edge of the thread between said deeper grooves is partially ground off, substantially as and for the purpose described.

5. In a screw-cutting head, the combination of a longitudinally-slotted block cut on one side at *e* for the free egress of cuttings, with a longitudinally-grooved cutter and a cutter-retaining device having ribs in engagement with the grooves of the cutter, substantially as described.

In testimony whereof I affix my signature in presence of two witnesses.

ABRAHAM B. LANDIS.

Witnesses:
JNO. B. RUSSELL,
ALF. N. RUSSELL.